US012066656B2

United States Patent
Sung

(10) Patent No.: US 12,066,656 B2
(45) Date of Patent: Aug. 20, 2024

(54) GRAPHENE OPTICAL DEVICE

(71) Applicant: LG ELECTRONICS INC., Seoul (KR)

(72) Inventor: Jinwoo Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/922,145

(22) PCT Filed: Apr. 29, 2020

(86) PCT No.: PCT/KR2020/005708
§ 371 (c)(1),
(2) Date: Oct. 28, 2022

(87) PCT Pub. No.: WO2021/221206
PCT Pub. Date: Nov. 4, 2021

(65) Prior Publication Data
US 2023/0176280 A1  Jun. 8, 2023

(51) Int. Cl.
*G02B 6/12* (2006.01)
(52) U.S. Cl.
CPC ...... *G02B 6/12* (2013.01); *G02B 2006/12069* (2013.01); *G02B 2006/12166* (2013.01)
(58) Field of Classification Search
CPC ............ G02B 2006/12166; G02B 2006/12069
See application file for complete search history.

(56) References Cited

U.S. PATENT DOCUMENTS

2014/0056551 A1  2/2014  Liu et al.

FOREIGN PATENT DOCUMENTS

| JP | 2014-164195 A | 9/2014 |
|---|---|---|
| JP | 2017-11209 A | 1/2017 |
| KR | 10-2017-0046386 A | 5/2017 |
| KR | 10-2017-0119812 A | 10/2017 |
| WO | WO2015/081538 A1 | 6/2015 |

OTHER PUBLICATIONS

English translation of WO 2015/081538 A1 (Year: 2015).*
English translation of KR 2017-0046386 A (Year: 2017).*

* cited by examiner

*Primary Examiner* — Sung H Pak
(74) *Attorney, Agent, or Firm* — Birch, Stewart, Kolasch & Birch, LLP

(57) ABSTRACT

A graphene optical device according to an embodiment of the present disclosure includes: an upper semiconductor layer; a lower semiconductor layer; and a graphene capacitor disposed between the upper semiconductor layer and the lower semiconductor layer, wherein the graphene capacitor includes a first graphene, a second graphene, and a first insulation layer disposed between the first graphene and the second graphene, wherein the first graphene and the second graphene partially overlap each other when viewed from the upper semiconductor layer toward the lower semiconductor layer.

18 Claims, 4 Drawing Sheets

GRAPHENE OPTICAL DEVICE

CROSS REFERENCE TO RELATED APPLICATIONS

This application is the National Phase of PCT/KR2020/005708 filed on Apr. 29, 2020, which is hereby expressly incorporated by reference into the present application.

TECHNICAL FIELD

The following description relates to a graphene optical device, and more particularly to an optical modulation device using graphene.

BACKGROUND ART

With the development of optical communication technology, research is increasingly conducted on an optical device for transmission, reception, and modulation. An optical modulator may transmit information derived from light by changing optical properties such as light intensity, light phase, and the like. For example, the optical modulator employs a change in light absorption rate caused by the supply of a current or voltage to an optical waveguide through which light passes. In the optical communication, modulation is related to characteristics and a processing speed of an optical signal, such that an excellent optical modulator may contribute to improving performance of the entire optical communication.

Graphene is a single two-dimensional (2D) layer of six carbon atoms organized in a hexagonal pattern and has a structure which is different from zero-dimensional fullerene, carbon nanotube with a one-dimensional tubular shape, and three-dimensional graphite.

Silicon, optical fiber, and the like are used for the optical waveguide. Graphene, having very high electron mobility compared to an existing material such as silicon and the like, is suitable for increasing a modulation speed and has a higher strength than a nanomaterial such as carbon nanotube and the like, such that research is increasingly conducted on the optical device using graphene.

A graphene optical modulation device applied to the waveguide may reduce a size and driving voltage of the device, and may be easily employed in an existing silicon platform, thereby enabling low costs, use of wider wavelength range, and high-speed operation.

DISCLOSURE OF INVENTION

Technical Problem

However, a currently manufactured graphene optical modulation device has an operating speed which is much lower than an operating speed suggested theoretically, and there is also a need to further improve energy efficiency of the device.

It is required to develop a device with a new structure and operation mode capable of efficiently improving an operating speed and energy efficiency.

It is an objective of the present disclosure to provide a graphene optical modulation device capable of increasing a modulation speed.

It is another objective of the present disclosure to provide a graphene optical modulation device capable of improving energy efficiency.

It is yet another objective of the present disclosure to provide a graphene optical modulation device capable of increasing transmittance and reducing resistance.

It is yet another objective of the present disclosure to solve the above technical problems, as well as all the other problems occurring or predicted to occur in a prior art.

Technical Solution

In order to achieve the above objectives, a graphene optical device according to an embodiment of the present disclosure includes graphenes which face each other with insulation layers therebetween and overlap each other in some region, thereby further improving optical modulation performance.

In order to achieve the above objectives, a graphene optical device according to an embodiment of the present disclosure includes: an upper semiconductor layer; a lower semiconductor layer; and a graphene capacitor disposed between the upper semiconductor layer and the lower semiconductor layer, wherein the graphene capacitor includes a first graphene, a second graphene, and a first insulation layer disposed between the first graphene and the second graphene, wherein the first graphene and the second graphene partially overlap each other when viewed from the upper semiconductor layer toward the lower semiconductor layer.

Meanwhile, the first graphene and the second graphene may overlap each other at a central portion having a high optical density, without overlapping at a peripheral portion disposed on a side of the central portion.

Meanwhile, the graphene capacitor may further include a second insulation layer disposed between the first graphene and the upper semiconductor layer, and a third insulation layer disposed between the second graphene and the lower semiconductor layer.

Meanwhile, the first insulation layer, the second insulation layer, and the third insulation layer may be connected to each other.

Meanwhile, the first insulation layer may be made of hexagonal boron nitride (h-BN).

Meanwhile, in order to achieve the above objectives, the graphene optical device according to an embodiment of the present disclosure may further include: a first electrode connected to the first graphene in a first direction; and a second electrode connected to the second graphene in a second direction opposite the first direction.

Meanwhile, the graphene capacitor may further include a first graphene gate disposed between the first graphene and the upper semiconductor layer, and a second graphene gate disposed between the second graphene and the lower semiconductor layer.

In addition, when viewed from the upper semiconductor layer toward the lower semiconductor layer, the first graphene and the second graphene may overlap each other in a region in which the first graphene and the second graphene do not overlap the first graphene gate and the second graphene gate.

In addition, in order to achieve the above objectives, the graphene optical device according to an embodiment of the present disclosure may further include: a third electrode connected to the first graphene gate; and a fourth electrode connected to the second graphene gate.

In addition, in order to achieve the above objectives, the graphene optical device according to an embodiment of the present disclosure may further include: a fourth insulation layer disposed between the third electrode and the first electrode: and a fifth insulation layer disposed between the fourth electrode and the second electrode.

In order to achieve the above objectives, a graphene optical device according to an embodiment of the present disclosure includes: an upper semiconductor layer; a lower semiconductor layer; and a graphene capacitor including a first graphene disposed at a lower side of the upper semiconductor layer, a second graphene disposed at an upper side of the lower semiconductor layer, and a first insulation layer disposed between the first graphene and the second graphene; a first electrode connected to the first graphene; and a second electrode connected to the second graphene, wherein the graphene capacitor includes a first wiring region in which a wiring portion of the first graphene connected to the first electrode is disposed, a second wiring region in which a wiring portion of the second graphene connected to the second electrode is disposed, and an overlapping region in which the first graphene and the second graphene are disposed and which is formed between the first wiring region and the second wiring region.

Meanwhile, the first electrode may be connected to the first graphene in a first direction, and the second electrode may be connected to the second graphene in a second direction opposite the first direction.

Meanwhile, the graphene capacitor may further include a first graphene gate disposed between the first graphene and the upper semiconductor layer, and a second graphene gate disposed between the second graphene and the lower semiconductor layer.

In addition, the first graphene gate may be disposed in the first wiring region, and the second graphene gate may be disposed in the second wiring region.

In addition, the graphene optical device according to an embodiment of the present disclosure may further include: a third electrode connected to the first graphene gate; and a fourth electrode connected to the second graphene gate.

In addition, the graphene optical device according to an embodiment of the present disclosure may further include: a fourth insulation layer disposed between the third electrode and the first electrode: and a fifth insulation layer disposed between the fourth electrode and the second electrode.

Meanwhile, the graphene capacitor may further include a second insulation layer disposed between the first graphene and the upper semiconductor layer, and a third insulation layer disposed between the second graphene and the lower semiconductor layer.

In addition, the first insulation layer, the second insulation layer, and the third insulation layer may be connected to each other.

Meanwhile, the upper semiconductor layer may be made of polycrystalline silicon, and the lower semiconductor layer may be made of crystalline silicon.

Meanwhile, the first insulation layer may be made of hexagonal boron nitride (h-BN).

Advantageous Effects of Invention

According to at least one of the embodiments of the present disclosure, a modulation speed of a graphene optical modulation device may be improved.

In addition, according to at least one of the embodiments of the present disclosure, energy efficiency of a graphene optical modulation device may be improved.

In addition, according to at least one of the embodiments of the present disclosure, transmittance of a graphene optical modulation device may increase, and resistance may be reduced.

Meanwhile, various other effects will be explicitly or implicitly disclosed in the following detailed description of embodiments of the present disclosure.

MODE FOR THE INVENTION

Figure 1:
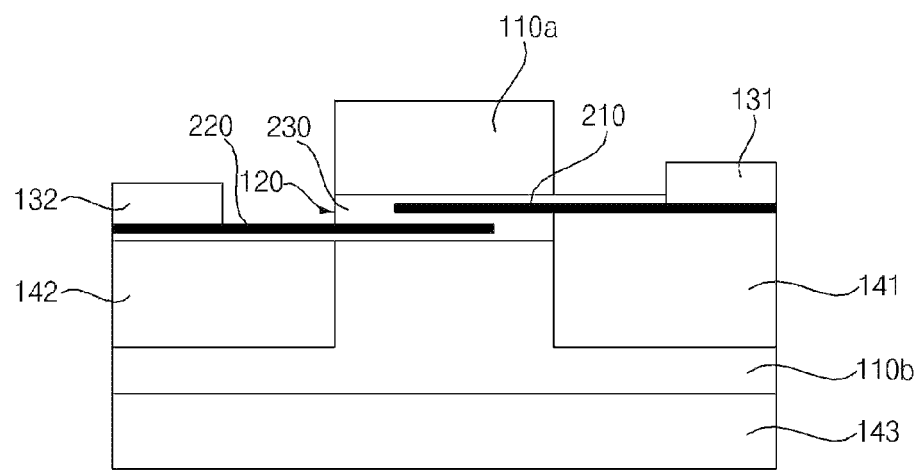
FIG. 1 is a cross-sectional view of a graphene optical device according to an embodiment of the present disclosure.

Reference will now be made in detail to the preferred embodiments of the present disclosure with reference to the accompanying drawings. However, it will be understood that the present disclosure should not be limited to the embodiments and may be modified in various ways.

The present disclosure is defined only by the appended claims, and if meanings of terms are specifically described in the specification, the terms will be defined by the description. The same reference numerals refer to the same parts throughout the specification.

Further, it will be understood that, although the terms first, second, etc., may be used herein to describe various elements, these elements should not be limited by these terms. These terms are only used to distinguish one element from another.

Figure 2:
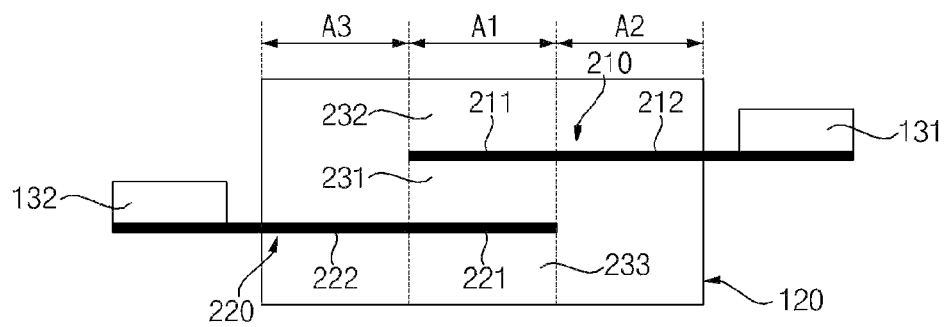
FIG. 2 is an enlarged view of a portion of the graphene optical device of FIG. 1.

FIG. 1 is a cross-sectional view of a graphene optical device according to an embodiment of the present disclosure, and FIG. 2 is an enlarged view of a portion of the graphene optical device of FIG. 1.

Referring to FIGS. 1 and 2, the graphene optical device according to an embodiment of the present disclosure may include an upper semiconductor layer 110a, a lower semiconductor layer 110b, a graphene capacitor 120 disposed between the upper semiconductor layer 110a and the lower semiconductor layer 110b.

The upper semiconductor layer 110a, the lower semiconductor layer 110, and the graphene capacitor 120 may form an optical waveguide through which light passes. By using very high electron mobility characteristics of the graphenes 210 and 220, the graphene capacitor 120 including graphenes 210 and 220 may allow light to pass through the center of the optical waveguide faster.

The upper semiconductor layer 110a and the lower semiconductor layer 110b as semiconductor layers may be disposed at an upper side and a lower side of the graphene capacitor 120, respectively.

The upper semiconductor layer 110a and the lower semiconductor layer 110b may be made of silicon, germanium, and other semiconductor materials. For example, the lower semiconductor layer 110b may be made of polycrystalline silicon (P-Si), and the lower semiconductor layer 110b may be made of crystalline silicon (Si).

The lower semiconductor layer 110b may be formed on a substrate (not shown). In some cases, the lower semiconductor layer 110b may be made of the same material as the substrate. For example, the lower semiconductor layer 110b and the substrate may be made of silicon (Si) and the like.

An insulator 143 may be disposed on one surface of the lower semiconductor layer 110b. In some embodiments, the insulator 143 may be an oxide film for protecting the surface of the lower semiconductor layer 110b. For example, the insulator 143 may be formed as a thin film oxide layer of non-crystalline silicon dioxide ($SiO_2$). Alternatively, the insulator 143 may be an insulating substrate of $SiO_2$ and the like.

Meanwhile, the graphene capacitor 120 may include a first graphene 210, a second graphene 220, and a first insulation layer 231 disposed between the first graphene 20 and the second graphene 220. That is, the graphene capacitor 120 may include two graphenes 210 and 220, facing each other, and the first insulation layer 231 disposed between the facing two graphenes 210 and 220.

The first and second graphenes 210 and 220 are disposed in an optical region of the optical waveguide and are transparent. The first and second graphenes 210 and 220 may be parallel to one surface of the lower semiconductor layer 110 and/or the upper semiconductor layer 110a and may be spaced apart from each other by a predetermined distance. The first and second graphenes 210 and 220 may be single-layer graphene sheets.

The first insulation layer 231 may be made of an insulating material. More preferably, the first insulation layer 231 may be made of hexagonal boron nitride (h-BN). Like the graphenes 210 and 220, the hexagonal boron nitride (h-BN) is transparent and flexible with excellent mechanical properties, such that it is suitable for use in the optical waveguide along with the graphenes 210 and 220.

The capacitor is formed in a structure in which the graphenes 210 and 220, facing each other and parallel to the optical waveguide, are spaced apart from each other by the first insulation layer 231.

When a predetermined voltage is applied to the spaced-apart graphenes 210 and 220, the Fermi level of any one the graphenes 210 and 220 increases, and the Fermi level of the other one decreases. Accordingly, an amount of carriers absorbed into the respective graphenes 210 and 220 is reduced. As the amount of absorbed light is reduced, an amount of light passing through the optical waveguide increases.

A graphene optical modulation device according to an embodiment of the present disclosure has a structure in which graphenes having optical modulation performance are coupled to the optical waveguide, in which a size and a driving voltage of the device may be reduced, and the graphene optical modulation device may be easily employed in an existing silicon platform, thereby enabling low costs, use of wider wavelength range, and high-speed operation.

When viewed from the upper semiconductor layer 110a toward the lower semiconductor layer 110b, i.e., when viewed vertically, the first and second graphenes 210 and 220 may partially overlap each other. In order to improve a modulation speed of the optical modulation device, it is required to reduce resistance and capacitance. To this end, in consideration of a light mode profile of the optical waveguide, unnecessary capacitance may be reduced by removing a portion of the graphene capacitor located at a position where an optical density is low and by maintaining a capacitor located at a position where light is concentrated. Referring to FIGS. 1 and 2, when viewed from the upper semiconductor layer 110a toward the lower semiconductor layer 110b, the first and second graphenes 210 and 220 may overlap each other in a first region A1. In addition, the first and second graphenes 210 and 220 may not overlap each other in second and third regions A2 and A3 which are disposed on the sides of the first region A1. That is, the first graphene 210 and the second graphene 210 overlap each other at a central portion A1 having a high optical density, without overlapping at peripheral portions A2 and A3 disposed on the sides of the central portion.

That is, in the graphene capacitor 120 according to an embodiment of the present disclosure, the two graphenes 210 and 220 face each other with a space therebetween only in the first region A1, and the two graphenes 210 and 220 do not face each other in the other regions. According to an embodiment of the present disclosure, capacitance may be reduced by optimizing a position and an occupancy rate of the graphene capacitor 120 in the waveguide. For example, in consideration of the light mode profile, in order to form a capacitor at the portion A1 having a high optical density without forming the capacitor at portions A2 and A3 having a low optical density, the graphene capacitor 120 is formed with two partially overlapping graphene sheets 210 and 220 which are arranged parallel to each other in the optical waveguide. In this manner, capacitance affecting the modulation speed may be greatly reduced without causing a significant change in modulation depth. In addition, by reducing capacitance, energy efficiency may increase (reduction in energy/bit).

Meanwhile, a first electrode 131 may be connected to the first graphene 210 in a first direction, and a second electrode 132 may be connected to the second graphene 220 in a second direction opposite the first direction. That is, the first electrode 131 and the second electrode 132 may be disposed on different sides at a predetermined distance from the graphene capacitor 120.

Meanwhile, the graphene capacitor 120 may further include a second insulation layer 232 disposed between the first graphene 210 and the upper semiconductor layer 110a, and a third insulation layer 233 disposed between the second graphene 220 and the lower semiconductor layer 110b. In this case, the first insulation layer 231, the second insulation layer 232, and the third insulation layer 233 may connected to each other.

In the graphene capacitor 120, the first and second graphenes 210 and 220 overlap each other only at the central portion A1 with a predetermined distance therebetween, without overlapping in the other regions A2 and A3, such that the graphenes may be removed from the non-overlapping regions A2 and A3. In addition, without being divided by the graphenes 210 and 220, the non-overlapping regions A2 and A3 may be formed by connecting the insulation layers 231, 232, and 233.

The graphene optical device according to an embodiment of the present disclosure may further include the first electrode 131 connected to the first graphene 210 in the first direction, and the second electrode 132 connected to the second graphene 220 in the second direction opposite the first direction.

The first and second electrodes 131 and 132 are electrodes for supplying power to the first and second graphenes 210 and 220, respectively, and may be made of known materials, such as chrome, gold, copper, alloy, and the like. The first and second electrodes 131 and 132 may be formed on the insulators 141 and 142, respectively. For example, the insulators 141 and 142 may be made of non-crystalline silicon dioxide ($SiO_2$).

Meanwhile, the first and second electrodes 131 and 132 are preferably spaced apart by a predetermined distance from the first and second graphenes 210 and 220, respectively. For example, in the case where the first and second electrodes 131 and 132 are opaque metal electrodes, the first and second electrodes 131 and 132 may be spaced apart by a predetermined distance from the first and second graphenes 210 and 220, so as not to interfere with light transmission.

Referring to FIGS. 1 and 2, the graphene optical device according to an embodiment of the present disclosure may include the graphene capacitor 120 including the upper semiconductor layer 110*a*, the lower semiconductor layer 110*b*, the first graphene 210 disposed at a lower side of the upper semiconductor layer 110*a*, the second graphene 220 disposed at an upper side of the lower semiconductor layer 110*b*, and the first insulation layer 231 disposed between the first graphene 210 and the second graphene 220, the first electrode 131 connected to the first graphene 210, and the second electrode 132 connected to the second graphene 220.

The graphene capacitor 120 may include a first wiring region A2 in which a wiring portion 212 of the first graphene 210 connected to the first electrode 131 is disposed, a second wiring region A3 in which a wiring portion 222 of the second graphene 220 connected to the second electrode 132 is disposed, and an overlapping region A1 which is disposed between the first wiring region A2 and the second wiring region A3 and in which the first graphene 210 and the second graphene 220 are disposed.

That is, the first graphene 210 and the second graphene 220 may include the wiring portions 212 and 222 connected to the first and second electrodes 131 and 132, respectively, and the overlapping portions 211 and 221 that face each other. Accordingly, the first graphene 210 and the second graphene 220 face each other in the overlapping region A1 at the center of the graphene capacitor 120, and only a connecting portion for connecting any one of the graphenes and the electrodes is formed in the wiring regions A2 and A3 at the periphery thereof, such that the other one of the graphenes may be removed therefrom. By removing some of the graphenes from the wiring regions A2 and A3, capacitance may be reduced, and energy efficiency may increase.

Figure 3:
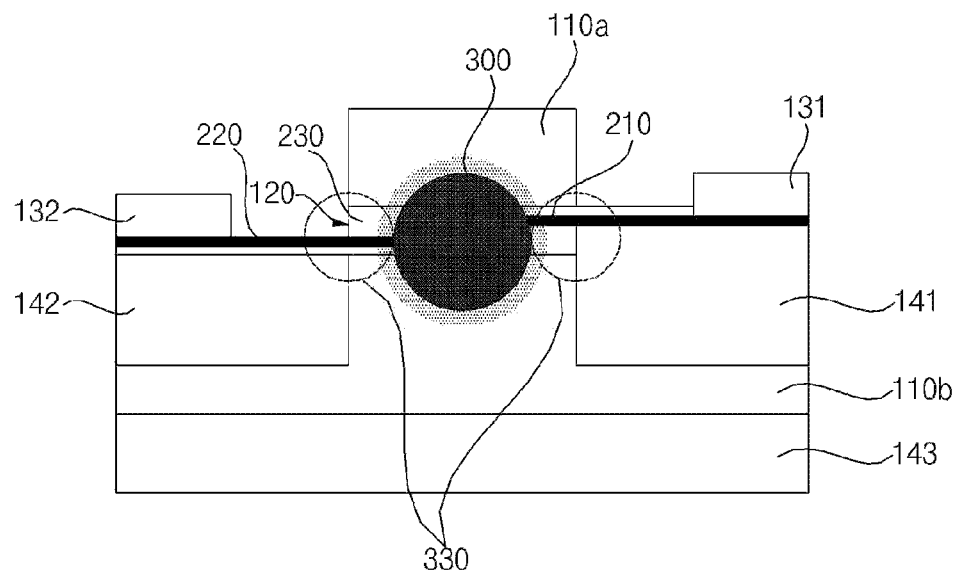
FIG. 3 is a diagram illustrating a light mode profile of an optical waveguide of a graphene optical device according to an embodiment of the present disclosure.

FIG. 3 is a diagram illustrating a light mode profile of an optical waveguide of a graphene optical device according to an embodiment of the present disclosure. Referring to FIG. 3, in the graphene optical modulation device using an optical waveguide, light 300 with a high optical density propagates to a specific portion of the optical waveguide. As the light 300 is concentrated on the center of the graphene capacitor 120, such that even by removing some of the graphenes from a peripheral region 330 with a low optical density, capacitance may be reduced effectively while minimizing a reduction in light transmitting performance.

Figure 4:
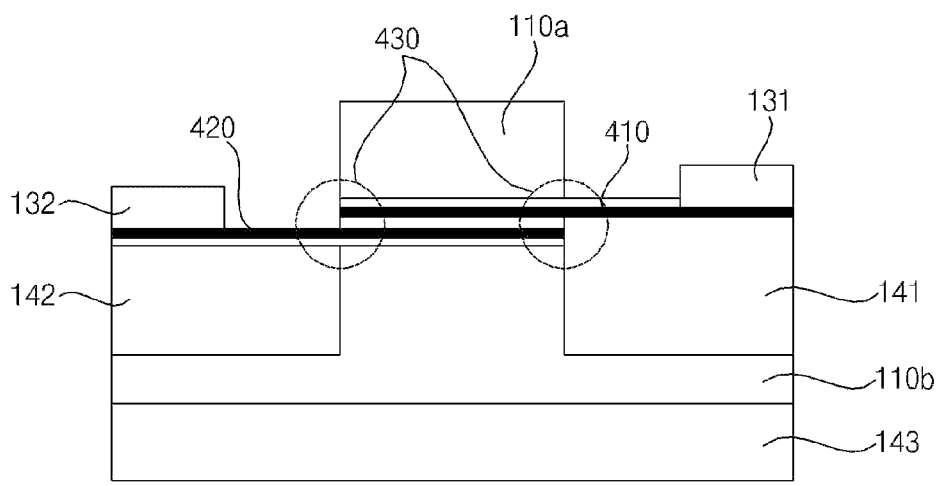
FIG. 4 is a diagram referred to in the description of optical modulation performance and energy efficiency performance of a graphene optical device according to an embodiment of the present disclosure.

FIG. 4 is a diagram referred to in the description of optical modulation performance and energy efficiency performance of a graphene optical device according to an embodiment of the present disclosure, in which an example of first and second graphenes 410 and 420 that face each other in the entire lower region of the upper semiconductor layer 110*a* is illustrated. In this case, both the first and second graphenes 410 and 420 are located even in a peripheral region 430 with a low optical density, such that capacitance and resistance are high, thereby reducing efficiency.

By contrast, according to embodiments of the present disclosure, a capacitor is formed with two graphenes 210 and 220 partially overlapping each other, such that a capacitor which is less useful and located at a portion 330 with a low optical density may be removed. Accordingly, the total capacitance may be greatly reduced with a slight reduction in optical modulation rate, thereby increasing a device speed and improving energy efficiency.

While the graphene has high electron mobility, a modulation speed is determined by the total resistance and capacitance of the device. When high capacitance is selected for a low driving voltage, and resistance of graphene wiring and graphene-metal contact resistance are high, a modulation speed is much lower than expected. In addition, for use in a 5G or higher generation optical communication device, it is also required to improve energy efficiency.

According to an embodiment of the present disclosure, a graphene gate is further included to remove unnecessary light absorption by the graphene wiring, thereby reducing resistance of the graphene wiring and graphene-metal contact resistance, to reduce the total resistance of the device. Accordingly, a light modulation speed may greatly increase compared to an existing device, and a device size and energy consumption may be reduced.

Figure 5:
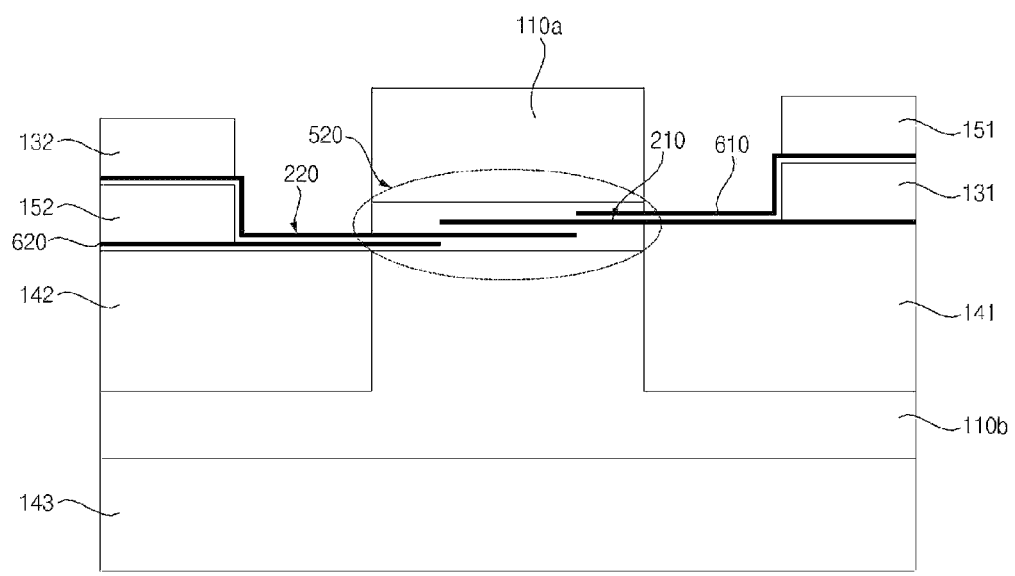
FIG. 5 is a cross-sectional view of a graphene optical device according to an embodiment of the present disclosure.
Figure 6:
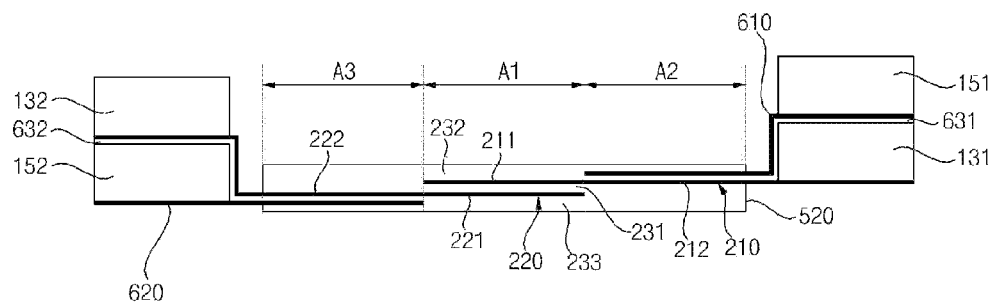
FIG. 6 is an enlarged view of a portion of the graphene optical device of FIG. 5.

FIG. 5 is a cross-sectional view of a graphene optical device according to an embodiment of the present disclosure, and FIG. 6 is an enlarged view of a portion of the graphene optical device of FIG. 5.

The embodiments of FIGS. 5 and 6 further include graphene gates 610 and 620 and electrodes 151 and 152 for supplying power to the graphene gates 610 and 620, in addition to the embodiments described above with reference to FIGS. 1 to 4. In the following description, the same parts of the embodiments will be omitted or will be briefly described, and the description will be focused on differences.

Referring to the drawings, a graphene capacitor 520 according to an embodiment of the present disclosure may include the first graphene 210, the second graphene 220, and the first insulation layer 231 disposed between the first graphene 210 and the second graphene 220.

According to embodiments of the present disclosure, two graphene sheets 210 and 220 partially overlap each other in the optical waveguide, such that a capacitor having a low optical density is removed, and only a capacitor having a high optical density is maintained, thereby improving a modulation speed and energy efficiency.

The graphene capacitor 520 according to an embodiment of the present disclosure may further include a first graphene gate 610 disposed between the first graphene 210 and the upper semiconductor layer 110*a*, and a second graphene gate 620 disposed between the second graphene 220 and the lower semiconductor layer 110*b*.

When viewed from the upper semiconductor layer 110*a* toward the lower semiconductor layer 110*b*, the first graphene 210 and the second graphene 220 overlap each other in the region A1 in which the first and second graphenes 210 and 220 do not overlap the first graphene gate 610 and the second graphene gate 620.

That is, the first graphene gate 610 and the second graphene gate 620 are not disposed in the overlapping region A1, and the first graphene gate 610 may be disposed only in the first wiring region A2 and the second graphene gate 620 may be disposed only in the second wiring region A3.

In addition, the graphene optical device according to an embodiment of the present disclosure may further include a third electrode 151 connected to the first graphene gate 610 and a fourth electrode 152 connected to the second graphene gate 620. The third and fourth electrodes 151 and 152 are electrodes for supplying power to the first and second graphene gates 610 and 620, respectively, and may be made of known materials, such as chrome, gold, copper, alloy, and the like.

The third electrode 151 may be formed on the first electrode 131, and the fourth electrode 152 may be formed on the second electrode 132. In this case, the graphene optical device according to an embodiment of the present disclosure may further include a fourth insulation layer 631, disposed between the third electrode 151 and the first electrode 131, and a fifth insulation layer 632 disposed between the fourth electrode 152 and the second electrode 132, thereby providing insulation between the electrodes.

According to an embodiment of the present disclosure, in order to remove absorption by the wiring portions 212 and 22 of the graphenes 210 and 220, which function as wiring without constituting a capacitor, the graphene gates 610 and 520 and the graphene gate electrodes 151 and 152 may be employed to constantly provide a field effect. The field effect produced by the gates may reduce resistance of the graphene wiring and graphene-metal contact resistance, and the modulation speed and energy efficiency may be further improved.

The graphene gate electrodes 151 and 152 may supply power to the graphene gates 610 and 620. The graphene gate electrodes 151 and 152 may apply an electric field so that the graphene wiring portions 212 and 222 for connecting the overlapping portions 211 and 221 of the graphenes 210 and 220 to the metal electrodes 131 and 132 may be constantly maintained in a transparent state. The electric field applied by the graphene gate electrodes 151 and 152 may reduce the resistance of the graphene wiring portions 212 and 222 and contact resistance between the metal electrodes 131 and 132 and the graphene wiring portions 212 and 222.

Figure 7:
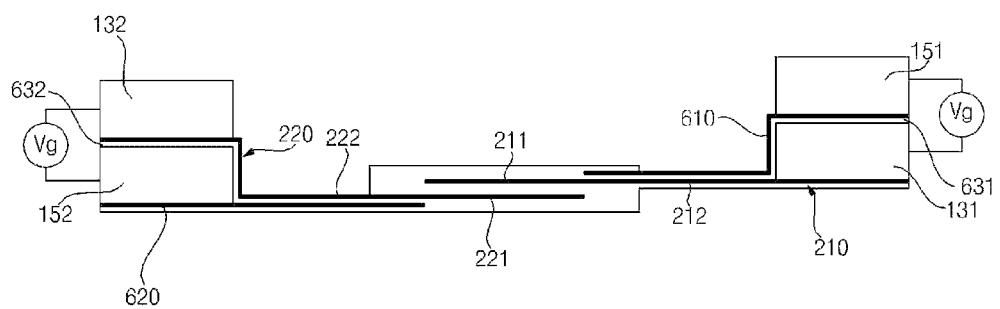
FIGS. 7 and 8 are diagrams referred to in the description of operation of a graphene optical device according to an embodiment of the present disclosure.
Figure 8:
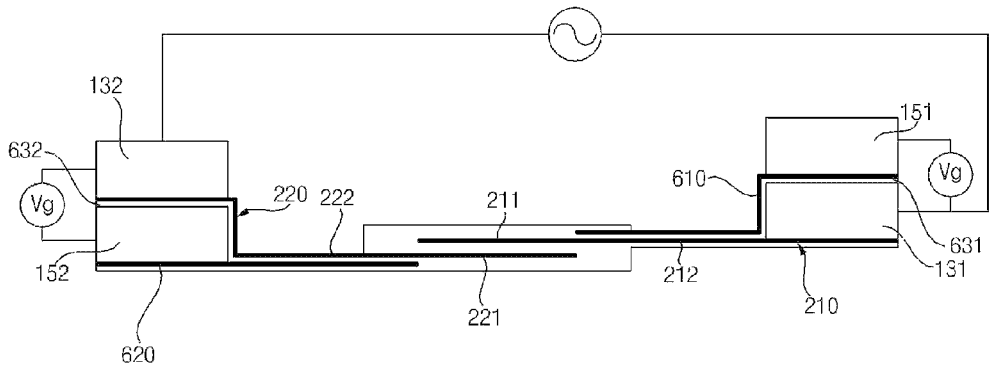

FIGS. 7 and 8 are diagrams referred to in the description of operation of a graphene optical device according to an embodiment of the present disclosure.

FIG. 7 is a conceptual diagram illustrating an example in which by applying a gate voltage, the wiring portions 212 and 222 are constantly maintained in a light transmitting state, and FIG. 8 is a schematic diagram illustrating an example in which while a voltage is applied to the respective gate electrodes 151 and 152, an electrical signal is applied to the graphene capacitor 520 for optical modulation.

An electric charge, accumulated by the field effect while a gate voltage is applied, reduces resistance of the graphene wiring portions 212 and 222 and contact resistance between the graphene wiring portions 212 and 222 and the electrodes 131 and 132.

In the graphene capacitor 520 according to the embodiments of FIGS. 5 to 8, a sheet resistance of highly doped graphene while the gate voltage is applied is 30 ohm/sq., and graphene-metal contact resistance while the gate voltage is applied is 100 ohm/sq., which are much smaller than the graphene sheet resistance of 2000 ohm/sq. and the graphene-metal contact resistance of 1000 ohm/sq. in a non-doped state (Dirac point) of the optical device illustrated in FIG. 4.

In addition, the graphene capacitor 520 according to the embodiments of FIGS. 5 to 8 has an electric capacity of 57 fF, which is smaller than an electric capacity of 114 fF of the optical device illustrated in FIG. 4.

According to embodiments of the present disclosure, transmittance may increase by accumulating an electric charge in two graphene capacitor plates 210 and 220 by applying a high voltage to the graphene capacitor 520 (transmission state, ON mode), and optical modulation may be performed by inducing a low transmission state (absorption state, OFF mode) by applying a low voltage or no voltage.

Even when the graphene capacitor 520 is in a transmission state by applying a voltage to accumulate an electric charge in the two graphene capacitor plates 210 and 220, the graphene wiring portions 212 and 222 may be in the absorption state, since no electric charge is accumulated in the graphene wiring portions 212 and 222 between the capacitor and metal.

In this case, optical loss may occur even during the transmission mode, such that in order to prevent light absorption by the wiring portions 212 and 222, a voltage may be applied constantly to the wiring portions 212 and 222 to accumulate an electric charge therein. That is, an electric field may be induced constantly by using the graphene gates 610 and 620 and the graphene gate electrodes 151 and 152, thereby causing the wiring portions 212 and 222 to be in the transmission state.

While the present disclosure has been particularly shown and described with reference to preferred embodiments thereof, it will be understood by those skilled in the art that the present disclosure is not limited to those exemplary embodiments and various changes may be made without departing from the scope and spirit of the invention as defined by the appended claims and should not be individually understood from the technical spirit or prospect of the present disclosure.

The invention claimed is:

1. A graphene optical device comprising:
an upper semiconductor layer;
a lower semiconductor layer; and
a graphene capacitor disposed between the upper semiconductor layer and the lower semiconductor layer,
wherein the graphene capacitor comprises a first graphene, a second graphene, a first insulation layer disposed between the first graphene and the second graphene, a first graphene gate disposed between the first graphene and the upper semiconductor layer, and a second graphene gate disposed between the second graphene and the lower semiconductor layer, and
wherein the first graphene and the second graphene partially overlap each other when viewed from the upper semiconductor layer toward the lower semiconductor layer.

2. The graphene optical device of claim 1, wherein the first graphene and the second graphene overlap each other at a central portion having a high optical density, without overlapping at a peripheral portion disposed on a side of the central portion.

3. The graphene optical device of claim 1, wherein the graphene capacitor further comprises a second insulation layer disposed between the first graphene and the upper semiconductor layer, and a third insulation layer disposed between the second graphene and the lower semiconductor layer.

4. The graphene optical device of claim 3, wherein the first insulation layer, the second insulation layer, and the third insulation layer are connected to each other.

5. The graphene optical device of claim 1, wherein the first insulation layer is made of hexagonal boron nitride (h-BN).

6. The graphene optical device of claim 1, further comprising:
a first electrode connected to the first graphene in a first direction; and a second electrode connected to the second graphene in a second direction opposite the first direction.

7. The graphene optical device of claim 1, wherein when viewed from the upper semiconductor layer toward the lower semiconductor layer, the first graphene and the second graphene overlap each other in a region in which the first graphene and the second graphene do not overlap the first graphene gate and the second graphene gate.

8. The graphene optical device of claim 1, further comprising:
a third electrode connected to the first graphene gate; and
a fourth electrode connected to the second graphene gate.

9. The graphene optical device of claim 1, further comprising:
a fourth insulation layer disposed between a third electrode and a first electrode: and
a fifth insulation layer disposed between a fourth electrode and a second electrode.

10. A graphene optical device comprising:
an upper semiconductor layer;
a lower semiconductor layer; and
a graphene capacitor comprising a first graphene disposed at a lower side of the upper semiconductor layer, a second graphene disposed at an upper side of the lower semiconductor layer, a first insulation layer disposed between the first graphene and the second graphene, a first graphene gate disposed between the first graphene and the upper semiconductor layer, and a second graphene gate disposed between the second graphene and the lower semiconductor layer;
a first electrode connected to the first graphene; and
a second electrode connected to the second graphene,
wherein the graphene capacitor comprises a first wiring region in which a wiring portion of the first graphene connected to the first electrode is disposed, a second wiring region in which a wiring portion of the second graphene connected to the second electrode is disposed, and an overlapping region in which the first graphene and the second graphene are disposed and which is formed between the first wiring region and the second wiring region.

11. The graphene optical device of claim 1, wherein the first electrode is connected to the first graphene in a first direction, and the second electrode is connected to the second graphene in a second direction opposite the first direction.

12. The graphene optical device of claim 10, wherein the first graphene gate is disposed in the first wiring region, and the second graphene gate is disposed in the second wiring region.

13. The graphene optical device of claim 10, further comprising:
a third electrode connected to the first graphene gate; and
a fourth electrode connected to the second graphene gate.

14. The graphene optical device of claim 13, further comprising:
a fourth insulation layer disposed between the third electrode and the first electrode: and
a fifth insulation layer disposed between the fourth electrode and the second electrode.

15. The graphene optical device of claim 10, wherein the graphene capacitor further comprises a second insulation layer disposed between the first graphene and the upper semiconductor layer, and a third insulation layer disposed between the second graphene and the lower semiconductor layer.

16. The graphene optical device of claim 15, wherein the first insulation layer, the second insulation layer, and the third insulation layer are connected to each other.

17. The graphene optical device of claim 10, wherein the upper semiconductor layer is made of polycrystalline silicon, and the lower semiconductor layer is made of crystalline silicon.

18. The graphene optical device of claim 10, wherein the first insulation layer is made of hexagonal boron nitride (h-BN).

* * * * *